Figure 1:
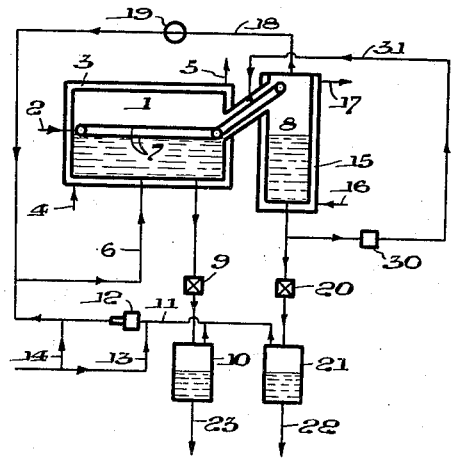

Sept. 15, 1959            W. E. DONATH            2,904,511
METHOD AND APPARATUS FOR PRODUCING PURIFIED
WATER FROM AQUEOUS SALINE SOLUTIONS
Filed June 17, 1955

INVENTOR.
WILM E. DONATH.

United States Patent Office 2,904,511
Patented Sept. 15, 1959

2,904,511

METHOD AND APPARATUS FOR PRODUCING PURIFIED WATER FROM AQUEOUS SALINE SOLUTIONS

Wilm E. Donath, Berkeley, Calif., assignor to Koppers Company, Inc., Pittsburgh, Pa., a corporation of Delaware Application June 17, 1955, Serial No. 516,193

5 Claims. (Cl. 210—59)

This invention relates to a method and apparatus for separating water from aqueous saline solutions and more particularly to a method and apparatus for producing purified water from sea water through the use of hydrate-forming reactions.

A cheap and effective way to produce fresh water from sea water has long been sought. Distillation is perhaps the oldest and still most widely used method. However, the fuel and equipment requirements of sea-water distillation are serious drawbacks and a cheaper and otherwise more satisfactory method for producing fresh water from sea water is needed in the arid regions of the world where sea water is available.

Numerous chemical treatments of sea water for producing fresh water or salt concentrates have been proposed. These have involved the adding of various reagents to react with the salts present in sea water and form products readily separable from the water. These chemical treatments are costly and they are important chiefly for the small-scale production of fresh water from sea water with portable equipment, for example, in shipwreck emergency kits.

The present invention resides in a method and apparatus for producing fresh water from sea water, brackish water, or other salt solutions which are feasible for large-scale operation. The method is based on a chemical treatment of salt water, but a treatment in which, in contrast to the mentioned prior art chemical methods, the water in the salt solution, rather than the salts therein is chemically reacted.

The method of the invention in general comprises continuously introducing into a hydrate-forming and hydrate-decomposing system a stream of aqueous saline solution. The solution stream is contacted in the hydrate-forming zone of the system with a hydrate-forming substance under hydrate-forming conditions of temperature and pressure and in molar proportions which provide a substantial excess of water over that required to form solid hydrates with all of the hydrate-forming substance, whereby a hydrate separable from the salt solution is formed and the concentration of the salt solution is increased. The hydrate is separated from the salt solution and the salt solution of increased concentration is continuously removed from the system. The hydrate, substantially free from salt solution, is conveyed to a hydrate-decomposing zone within the system. Within the hydrate-decomposing zone the solid hydrate is subjected to hydrate-decomposing conditions of temperature and pressure whereby to regenerate the hydrate-forming substance and produce purified water. The hydrate-forming substance is continuously recycled to the hydrate-forming zone and the purified water is continuously removed from the system as a product.

In preferred modifications of my method the hydrate-forming substance is selected from the group consisting of paraffin hydrocarbons having from one to four carbon atoms, carbon dioxide and mixtures thereof; a substantially uniform pressure is maintained in the entire hydrate-forming and hydrate-decomposing system, while the hydrate-decomposing zone is maintained at a higher temperature than the hydrate-forming zone; the hydrate, before being decomposed, is water-washed to remove salt solution; the streams of purified water and of salt solution of increased concentration are stripped of hydrate-forming substance before removal from the system.

The apparatus of the invention, in which my method can be carried out, in general comprises: a hydrate-forming chamber or vessel having means for the continuous introduction of salt water and hydrate-forming substance; a hydrate-decomposing chamber having means for continuous withdrawal of purified water; means for separating solid hydrate from salt solution between said hydrate-forming and hydrate-decomposing chambers and means for recycling hydrate-forming substance from said hydrate-decomposing chamber to said hydrate-forming chamber.

Figure 2:
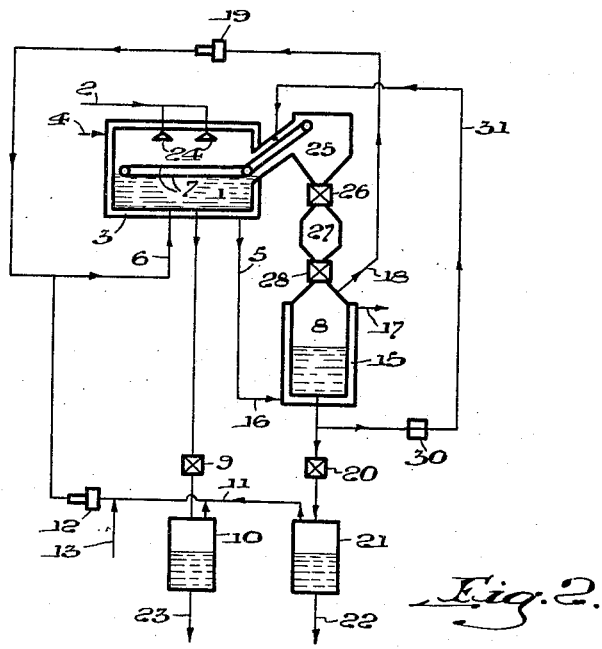

A further understanding of the invention can be obtained from the description which follows of particular ways in which the method of the invention can be practiced and of particular apparatus of the invention with which the method can be carried out. The description will be made with references to the drawing of which Figure 1 is a highly diagrammatic representation of one form of apparatus of the invention and a schematic flow sheet of a preferred modification of the method of the invention and Figure 2 is a similar representation of another modification of the apparatus and method.

Ocean water enters the hydrate-forming vessel 1 by means of line 2 and is maintained in vessel 1 under pressure sufficient for hydrate-formation at the temperature provided by cooling jacket 3. By way of example, when ethane is used as the hydrate-forming gas, a suitable pressure for the system is 485 pounds per square inch gauge and a suitable temperature for the hydrate-forming zone of vessel 1 is 57–58° F. To maintain the temperature of 57–58° F. in vessel 1, cooling jacket 3 is cooled by cold ocean water admitted through conduit 4 and leaving through conduit 5. Hydrate-forming gas, for example, ethane, is added under the pressure maintained in vessel 1 through line 6 by means of a distributor or sparger, not shown in the drawing. Solid hydrate of ethane formed in vessel 1 floats in the salt solution and is removed from it by means of feeder or conveyor 7 and carried into hydrate-decomposition vessel 8. On the inclined part of the feeder 7 connecting vessels 1 and 8, excess water drains to vessel 1. A liquid level in vessel 1 is maintained to permit hydrate removal by feeder 7 by means of valve 9 that controls discharge of water enriched in salts into receiver 10 maintained at atmospheric pressure. Dissolved hydrate-forming gas that is released from the enriched salt solution upon depressuring in receiver 10 leaves through line 11 into compressor 12 and is recycled into vessel 1. Make-up hydrate-forming gas can be added, if necessary through line 13 or 14.

Solid hydrate discharged into the hydrate-decomposing vessel 8 is decomposed by heat supplied from heating jacket 15. The temperature in vessel 8 is 60–70° F. Heating fluid enters the jacket through line 16 and leaves through line 17. Ethane liberated from hydrate leaves vessel 8 through conduit 18 and is recycled by means of pump 19 and line 6 into vessel 1. The hydrate-forming gas can return from vessel 8 to the vapor space of vessel 1 without use of recycle pump through the housing of the conveyor connecting these two vessels. Thus the conveyor housing serves as a means for recycle of the hydrate-forming gas. In this case, the hydrate-forming gas is absorbed at the surface of the solution contained in vessel 1 or by water sprayed into vessel 1.

Purified water in vessel 8 is depressured by means of valve 20 into receiver 21. Dissolved hydrate-forming gas which is liberated by the pressure decrease leaves through line 11. Purified water is discharged through line 22 and may be freed of dissolved hydrate-forming gas in an aerating tower, not shown in the drawing, or by vacuum treatment. Enriched salt water leaves receiver 10 by means of conduit 23 and can be freed of residual dissolved gas similarly.

Another embodiment of the invention is shown in Figure 2. While in the process of Figure 1 the hydrate was decomposed at essentially the same pressure at which it was formed, in the process of Figure 2 the hydrate is decomposed by pressure decrease. The process according to Figure 1 is generally preferred since its power requirements are small, no recompression of the recycle hydrate-forming gas being required. However, the embodiment of Figure 2 which will now be described may be advantageous in case of cooling water scarcity or comparatively high temperature of the available cooling water.

In Figure 2, salt water is fed into hydrate-forming vessel 1, maintained under the same temperature and pressure as in the process of Figure 1, by means of sprays 24 and the ethane hydrate is transported by means of feeder 7 into hopper 25. Hydrate is depressured by means of valve and lock hopper arrangement 26, 27, and 28 into hydrate-decomposition vessel 8. The heat of hydrate formation in vessel 1 is removed by cooling water entering through line 4. It leaves through line 5 and its heat content is utilized to heat vessel 8 by means of jacket 15 which it enters through line 16 and leaves through line 17. Since the pressure is one-half of that in vessel 1, hydrate decomposition in vessel 8 can take place at essentially the same or even at lower temperature than used for hydrate formation in vessel 1. Ethane leaving vessel 8 through line 18 is compressed by means of compressor 19 for recycle to vessel 1.

A preferred step of my method is the washing of the separated hydrate to remove entrained salt water before the hydrate is introduced into the decomposing zone. Purified water, before pressure let down, can be recycled for this purpose by means of pump 30 and line 31 to wash the separated hydrate. Also, the solid hydrate can be washed by decomposing it to some extent by pressure letdown or heating and removing the water formed.

For cooling and heating of vessels 1 and 8, the use of jackets has been shown in Figure 1 and 2. In large-scale operation, supply and removal of heat in these vessels can be achieved by recycling of an excess of the liquid in these vessels through outside heat exchangers (heaters or coolers). Heat pumps can be used to transfer heat from the hydrate-decomposing zone to the hydrate-forming zone. The separation of the hydrate from excess water can be achieved by means other than shown in Figures 1 and 2, e.g., by filtration, centrifuging, crystallization, or froth flotation by means of the hydrate-forming gas or other suitable means.

It is important in my method for the separation of hydrate from enriched salt solution to take place before the hydrate is decomposed. Thus, in the apparatus of the invention, the means for separating solid hydrate from salt solution, e.g., solids conveyor, filter, centrifuge, or the like, is placed between the hydrate-forming chamber and the hydrate-decomposing chamber.

The hydrate-forming gas that remains after depressuring in the purified water and salt solution streams can be, as mentioned, recovered by aeration or evacuation. If evacuation is used, the hydrate-forming gas can be returned to the process. If a combustible hydrate-forming gas, e.g., methane, ethane, propane, etc. is used and recovered by aeration, the air containing small amounts of gas can be used for power generation, for instance, in a gas turbine. In large-scale installations, the energy content of the water leaving the hydrate-formation and decomposition zones will be utilized in expansion engines or turbines.

In the descriptions above of specific embodiments of my method I have, by way of example, described the use of gaseous ethane as the hydrate-forming substance. However, other common gases, gas mixtures, and gas-liquid combinations known for their ability to form hydrates can also be used. The preferred hydrate-forming substances for my method are carbon dioxide and the paraffin hydrocarbons having from one to four carbon atoms, that is to say, methane, ethane, propane, n-butane and isobutane. Any one of these compounds or any mixture of two or more can be used as the hydrate-forming substances. Preferred mixtures include propane with carbon dioxide, isobutane or propane with methane, and isobutane with carbon dioxide. While the described processes utilize a hydrate forming substance entirely in the gaseous state, in both the hydrate-forming and hydrate-decomposing stages of my method, it is also possible for my method to be performed with a hydrate-forming substance which is a liquid-gas mixture or a liquid. For example, if the hydrate-forming substance is a mixture of propane and methane or a mixture of isobutane and carbon dioxide, conditions can be used such that the propane will be liquid in either the hydrate-forming stage or the hydrate-decomposing stage or in both stages. In this case the liquid hydrate former can be used to wash salts or salt water off the hydrate in the hydrate-forming zone.

The preferred hydrate-forming gases, mixtures of gases and liquid-gas mixtures which I have mentioned are satisfactory hydrate formers; they are relatively cheap, non-corrosive, and reasonably safe. Their hydrates are formed with relatively low energy demand, comparable with the heat of fusion of ice and much less than the heat of evaporation of water, so that the use of hydrate-forming reactions can be more economical in energy input than distillation methods of water purification. Other suitable hydrate-forming substances include ethylene, acetylene, methyl chloride, ethyl fluoride, chlorine, argon, etc., whether in gaseous or liquified form.

I have described above a pressure and temperature for hydrate formation with a particular hydrate-forming substance. The choice of pressure and temperature for the hydrate-forming zone and hydrate-decomposing zone will depend upon which hydrate-forming substance is used. In general, pressures suitable for use with the preferred hydrate-forming substances range from about 100 to 5,000 and preferably 100 to 1,000 pounds per square inch gauge and suitable temperatures range from about 32 to 80° F., and preferably from 40 to 75° F. For the hydrate-forming zone a combination of temperature and pressure is chosen from the ranges indicated which is conducive to the formation of the solid hydrate of the particular gas being used. It is preferred to use a temperature in the hydrate-forming zone which can be maintained by available cooling water. For the hydrate-decomposing zone, in the modification of the invention described with Figure 1, the pressure will be substantially the same as in the hydrate-forming zone and the temperature will be sufficiently higher, e.g., 2 to 20° F. or more, to cause decomposition of the solid hydrate.

In the modification described with Figure 2, the pressure in the decomposition zone should be lower than in the hydrate-forming zone to cause decomposition of the hydrate. For example, the pressure in the decomposition zone is one-half to two-thirds of that in the hydrate-forming zone or even less. The temperature can be about the same or somewhat higher or even lower than in the hydrate-forming zone, provided the combination of temperature and pressure is conducive to the decomposition of the hydrate. The temperature difference between the hydrate-forming and decomposing zones is preferably less than 20° F. in the modification of Figure 2.

The ratio of hydrate-forming gas to water should be smaller than needed for the conversion of all the water into hydrate. The minimum amount of gas fed should be greater than the amount that is soluble under the conditions prevailing in the hydrate-formation zone, since only then is formation of solid hydrate possible. The ratio of hydrate former to water will thus depend upon the nature of the hydrate former and the operating conditions. In general, the ratio should be such that at least 5% and less than 90%, preferably 10-80%, of the water fed is converted into hydrate.

Obviously, many modifications and variations of the invention as herein before set forth may be made without departing from the spirit and scope thereof and therefore only such limitations should be imposed as are indicated in the appended claims.

I claim:

1. An apparatus for producing purified water from salt water which comprises a hydrate-forming vessel having means for continuously introducing salt water and means for continuously introducing a hydrate-forming gas, a hydrate-decomposing vessel having means for continuous withdrawal or purified water, hydrate conveyor means extending upwardly for conveying hydrate from said hydrate-forming vessel to said hydrate-decomposing vessel, means for introducing water to said hydrate conveyor means at a level above said hydrate-forming zone, and means for recycling hydrate-forming gas from said hydrate-decomposing zone to said hydrate-forming zone.

2. The method for producing purified water from an aqueous salt solution comprising contacting the aqueous salt solution with a material which forms a solid hydrate in a hydrate-forming zone maintained at hydrate-forming temperature and pressure to form a solid hydrate, said hydrate-forming material being a gas at room temperature and atmospheric pressure, separating said hydrate from the remaining aqueous salt solution of increased concentration, subjecting said hydrate to hydrate-decomposing conditions of temperature and pressure in a hydrate-decomposing zone whereby purified water and hydrate-forming substance are formed, recovering said purified water from said decomposing zone, and recycling said hydrate-forming substance to said hydrate-forming zone.

3. The method set forth in claim 2 wherein substantially the same pressure is maintained in both the hydrate-forming zone and the hydrate-decomposing zone.

4. The method for producing purified water from sea water comprising contacting the sea water with a material which forms a solid hydrate in a hydrate-forming zone maintained at hydrate-forming temperature and pressure to form a solid hydrate, said hydrate-forming material being a gas at room temperature and atmospheric pressure, separating said hydrate from the remaining sea water, of increased concentration, washing said hydrate with water to remove occluded salts, subjecting said hydrate to hydrate-decomposing conditions of temperature and pressure in a hydrate-decomposing zone whereby purified water and hydrate-forming substance are formed, recovering said purified water from said decomposing zone, and recycling said hydrate-forming substance to said hydrate-forming zone.

5. The method for producing purified water from an aqueous salt solution comprising contacting the aqueous salt solution with a hydrocarbon which forms a solid hydrate in a hydrate-forming zone maintained at hydrate-forming temperature and pressure to form a solid hydrate, said hydrocarbon being a gas at room temperature and atmospheric pressure, separating said hydrate from the remaining aqueous salt solution of increased concentration, subjecting said hydrate to hydrate-decomposing conditions of temperature and pressure in a hydrate-decomposing zone whereby purified water and hydrocarbon are formed, recovering said purified water from said decomposing zone, burning a portion of said recovered hydrocarbon to satisfy the energy requirements of the process, and recycling the remainder of said recovered hydrocarbon to said hydrate-forming zone.

References Cited in the file of this patent

UNITED STATES PATENTS

| | | |
|---|---|---|
| 1,441,731 | Mathis | Jan. 9, 1923 |
| 2,271,214 | Welty | Jan. 27, 1942 |
| 2,356,407 | Hutchinson | Aug. 22, 1944 |
| 2,375,559 | Hutchinson | May 8, 1945 |
| 2,399,723 | Crowther | May 7, 1946 |
| 2,528,028 | Barry | Oct. 31, 1950 |

FOREIGN PATENTS

| | | |
|---|---|---|
| 668,812 | Germany | Dec. 10, 1938 |